(12) United States Patent
Van Den Berg

(10) Patent No.: US 8,316,799 B2
(45) Date of Patent: *Nov. 27, 2012

(54) INSTALLATION FOR SUPPLYING LIQUID FEED TO AN ANIMAL AND AN AUTONOMOUSLY DISPLACEABLE VEHICLE FOR USE IN SUCH AN INSTALLATION

(75) Inventor: Karel Van Den Berg, Bleskensgraaf (NL)

(73) Assignee: Maasland N.V., Maassluis (NL)

( * ) Notice: Subject to any disclaimer, the term of this patent is extended or adjusted under 35 U.S.C. 154(b) by 57 days.

This patent is subject to a terminal disclaimer.

(21) Appl. No.: 13/072,902

(22) Filed: Mar. 28, 2011

(65) Prior Publication Data

US 2011/0174227 A1    Jul. 21, 2011

Related U.S. Application Data

(62) Division of application No. 12/135,230, filed on Jun. 9, 2008, now Pat. No. 7,934,469.

(51) Int. Cl.
*A01K 7/02* (2006.01)
*A01K 9/00* (2006.01)

(52) U.S. Cl. ....... 119/51.02; 119/71; 119/72; 119/14.18

(58) Field of Classification Search ............... 119/14.03, 119/14.18, 51.01, 51.02, 71, 72, 73; 239/29.3
See application file for complete search history.

(56) References Cited

U.S. PATENT DOCUMENTS

| 2,966,256 | A |   | 12/1960 | McLeland |
|---|---|---|---|---|
| 3,204,607 | A | * | 9/1965 | Arnold et al. ............... 119/51.11 |
| 3,273,038 | A |   | 9/1966 | Miller |
| 3,421,484 | A | * | 1/1969 | Flocchini ........................ 119/71 |
| 4,269,356 | A | * | 5/1981 | Rose .............................. 239/167 |
| 4,550,685 | A | * | 11/1985 | Forster ........................... 119/71 |
| 4,674,048 | A |   | 6/1987 | Okumura |
| 4,962,453 | A |   | 10/1990 | Pong |
| 5,109,566 | A |   | 5/1992 | Kobayashi |
| 5,309,592 | A |   | 5/1994 | Hiratsuka |
| 5,341,540 | A |   | 8/1994 | Soupert |
| 5,551,374 | A |   | 9/1996 | Wells |

(Continued)

FOREIGN PATENT DOCUMENTS

DE    1109441 B2    6/1961

(Continued)

OTHER PUBLICATIONS

International Search Report issued on Jan. 15, 2007.

*Primary Examiner* — Rob Swiatek
(74) *Attorney, Agent, or Firm* — Coraline J. Haitjema; David P. Owen; Hoyng Monegier LLP

(57) ABSTRACT

An installation for supplying liquid feed to an animal, such as a calf. The installation comprises one or more feed loading places and one or more feed unloading places, and one or more vehicles that are autonomously displaceable, controlled by a microprocessor or the like, between one or more feed loading places and one or more feed unloading places, each vehicle comprising a drinking nozzle, such as a flexible teat, which is movably mounted relative to the remaining part of the displaceable vehicle, and a height adjusting device for adjusting a height of the drinking nozzle.

9 Claims, 2 Drawing Sheets

U.S. PATENT DOCUMENTS

| | | |
|---|---|---|
| 5,646,494 A | 7/1997 | Han |
| 5,709,170 A * | 1/1998 | Gerbo et al. ................ 119/72.5 |
| 5,816,192 A | 10/1998 | Van Der Lely |
| 6,439,162 B1 | 8/2002 | Van Den Berg |
| 6,443,093 B1 | 9/2002 | Van Der Lely |
| 7,934,469 B2 * | 5/2011 | Van Den Berg ........... 119/14.03 |
| 2003/0226341 A1 | 12/2003 | De Groen |

FOREIGN PATENT DOCUMENTS

| | | | |
|---|---|---|---|
| DE | 1183301 | B2 | 3/1962 |
| DE | 4444508 | B2 | 12/1994 |
| EP | 0943235 | B2 | 9/1999 |
| EP | 1369010 | B2 | 10/2003 |
| EP | 1369017 | B2 | 10/2003 |
| GB | 1487360 | B2 | 9/1977 |
| GB | 2313190 | B2 | 11/1997 |
| NL | 6901798 | B2 | 8/1969 |
| NL | 6804964 | B2 | 10/1969 |
| WO | WO96/03259 | A1 | 2/1996 |
| WO | WO 00/70941 | A1 | 11/2000 |

* cited by examiner

INSTALLATION FOR SUPPLYING LIQUID FEED TO AN ANIMAL AND AN AUTONOMOUSLY DISPLACEABLE VEHICLE FOR USE IN SUCH AN INSTALLATION

CROSS REFERENCE TO RELATED APPLICATIONS

This application is a division of U.S. application Ser. No. 12/135,230 filed on Jun. 9, 2008, which is a continuation of International Application No. PCT/NL2006/000568 filed on Nov. 14, 2006, which claims priority from Netherlands application no. 1030611 filed on Dec. 7, 2005. The contents of all of the aforementioned applications are hereby incorporated by reference in their entirety.

BACKGROUND OF THE INVENTION

1. Field of the Invention

The present invention relates to an installation for supplying liquid feed to an animal, such as a calf.

2. Description of the Related Art

An installation is known from EP-B1-1037524 the contents of which are hereby incorporated by reference in their entirety. This known installation comprises a milking machine for producing milk. This milk is either directly supplied to an animal or first stored in a storage device and subsequently automatically supplied to an animal. The known installation further comprises a line system for transporting the milk obtained from the milking machine to an animal, such as a calf, or to the storage device. Since the animals, such as calves, for which the milk is intended, are accommodated individually or in a group in a separate stable section located remotely from the milking machine, said stable section often being located in the open air, a line system with a considerable length is needed. Moreover, the line system has to be protected against frost. This means that the known installation is relatively large in size and difficult to install and, consequently, relatively expensive.

BRIEF SUMMARY OF THE INVENTION

The present invention aims inter alia at providing an installation for supplying liquid feed to an animal, such as a calf, which installation may be of relatively simple construction, flexible in use and relatively cheap.

According to the invention, this is achieved in that an installation for supplying liquid feed to an animal, such as a calf, comprises one or more feed loading places, one or more feed unloading places, and one or more vehicles that are autonomously displaceable, controlled by a processor, between one or more feed loading places and one or more feed unloading places, each vehicle comprising a drinking nozzle. Owing to the fact that the installation comprises one or more vehicles that are autonomously displaceable, controlled by a microprocessor or the like, between one or more feed loading places and one or more feed unloading places, it is possible for the milk obtained to be transported to the calf by means of the vehicle, instead of by means of the known line system. Owing to the fact that each vehicle comprises a drinking nozzle, such as a flexible teat, the milk can be supplied directly to the calf by the vehicle, so that additional lines for supplying the milk to the calf are neither needed.

It is pointed out here that an autonomously displaceable vehicle for supplying feed to a feed unloading place is known per se from EP-A-0739161, the contents of which are also hereby incorporated by reference in their entirety. However, this known vehicle is not suitable for supplying liquid feed, such as milk, directly to an animal, such as a calf.

In an embodiment of an installation according to the invention, the vehicle comprises one or more thermally insulating storage means for liquid feed. Such an insulating storage device, such as a storage device resembling a thermos jug, ensures that the temperature of the liquid feed obtained at the feed loading place will remain as constant as possible during transport to the feed unloading place.

Although it is possible to make use of an active control of the temperature of the liquid feed present on the autonomously displaceable vehicle, such an active control requires a certain amount of energy. For the purpose of supplying this energy from the autonomously displaceable vehicle itself, it would be possible to make use of a separate supply source, which, however, occupies much place and, and, due to its weight, requires more energy for propelling the autonomously displaceable vehicle. Alternatively, it would be possible to use for the temperature control the same energy source as that being used for propelling the autonomously displaceable vehicle. However, this means that there is less energy available for propelling, so that the working range of the autonomously displaceable vehicle is adversely affected. Consequently, in a preferred embodiment of the invention, the vehicle comprises a passive heat exchanger. Contrary to an active control, a passive heat exchanger occupies less space and is less heavy and, furthermore, such a passive heat exchanger does not use energy, so that the working range of the autonomously displaceable vehicle is not adversely affected, except for the little loss of working range due to the weight added to the vehicle as a result of the presence of the passive heat exchanger.

A particularly suitable and effective passive heat exchanger comprises a reservoir for hot water for heating/cooling the liquid feed. The water to be received by the reservoir is preferably obtained from an element for automatically supplying hot water in the reservoir, the element comprising a heating device for the water. Such an element with a heating device can be located anywhere in the installation, it being possible for the heating device to be provided with energy by the usual mains power supply.

Autonomously displaceable vehicles for numerous applications are known per se, many different ways of automatically controlling the vehicle being used. Since there are several loading and unloading places in the installation according to the invention, it is advantageous, inter alia for keeping the temperature of the liquid feed as constant as possible, if the microprocessor or the like is provided with a computer with a memory, the memory being designed to contain data relating to expected and/or historical travelling times of a displaceable vehicle from a particular feed loading place to a relevant feed unloading place, and/or from a given feed unloading place to another feed unloading place and/or from a feed loading place to another feed loading place. This makes it possible, when supplying feed, not only to take the travelling times of the vehicle into account, but also to control the heating device at least partially with the aid of the data relating to the expected and/or historical travelling times. If, for example, the travelling time is proportionally long, the hot water can be proportionally hotter for keeping the liquid feed longer at a particular temperature.

A displaceable vehicle is advantageously provided with a temperature sensor for measuring the temperature of the liquid feed and for supplying a temperature signal indicative of the temperature of the liquid feed. In this case, the displaceable vehicle preferably comprises an activating element for effecting the heating and/or cooling of the liquid feed by the passive heat exchanger, the activating element being controlled by the temperature signal. In this case, the activating element can be, for example, a valve that is opened so that hot water from the reservoir, located on the vehicle at a higher level than a storage device for the liquid feed, will flow along the liquid feed by gravitational force. In particular, the installation also comprises a sensor for measuring the outside temperature, the memory being designed to contain data relating to the outside temperature, so that, for example, the hot water can be brought to a temperature that, taking the (expected) travelling time and the outside temperature into account, ensures that the liquid feed will have the desired temperature at its arrival at the feed unloading place.

In a preferred embodiment of the installation according to the invention, the drinking nozzle is movably mounted relative to the remaining part of the displaceable vehicle. This means that, on the one hand, it is possible, for example, to move the drinking nozzle forward in such a way that it is easily accessible for an animal and, on the other hand, it is possible to attune the position of the drinking nozzle to the dimensions of an animal. In the latter case, it is advantageous if the displaceable vehicle is provided with animal identification means for identifying an animal and for supplying an identification signal indicative of the identity of an animal, the identification signal, besides for other objectives, such as supplying particular sorts of feed, being used in particular for moving the drinking nozzle.

An installation according to the invention is in particular applicable to a feed loading place comprising a milking machine. It is most preferable for the milking machine to comprise a device for automatically connecting teat cups.

The milk obtained in such a milking machine being relatively warm, it would be advantageous to transport the milk obtained as quickly as possible to a relevant animal in order that as little energy as possible is needed to keep the milk at a particular temperature. In an embodiment of an installation according to the invention, this is achieved in that the milking machine comprises a detection device for detecting the arrival of an animal in the milking machine and for supplying a detection signal. Said detection signal can then be used for controlling the displacement of the displaceable vehicle, so that the vehicle is displaced to the relevant milking machine by means of the detection signal. In this manner it is possible for the vehicle to arrive at the milking machine as quickly as possible and to take the milk that has cooled as little as possible from the milking machine or a storage device located in its vicinity.

The installation preferably comprises one or more individual feeding places (also called igloo-housings), each for containing only one animal, and one or more group feeding places, each for containing several animals.

In order to provide a sufficient animal feeding, an embodiment of an installation according to the invention comprises means for controlling one or more displaceable vehicles in such a way that at least twice a day liquid feed is offered twice to each individual feeding place and to each group feeding place. Such a control is achieved in particular by means of software.

Each displaceable vehicle is preferably provided with means for supplying liquid feed to an animal, the means for supplying liquid feed to an animal in a group feeding place supplying feed on the basis of an animal identification signal. A group feeding place can be determined as such by making use of means for determining the position of the displaceable vehicle that are known per se, which means compare the current position with the position of the group feeding place, which position may have been inputted beforehand into the computer/microprocessor for controlling the vehicle.

Since animals in individual feeding places need not be provided with a device for supplying an animal identification signal (these animals are, for example, intended for slaughter), in a favorable embodiment of an installation according to the invention, the installation is provided with means for determining the position of each individual feeding place and for supplying a position signal, and the means for supplying liquid feed to an animal in an individual feeding place supply feed on the basis of the relevant position signal. The sort of feed to be supplied may, for example, be inputted beforehand into the computer/microprocessor, for example by a farmer who wishes to give an animal in a particular individual feeding place always a particular sort and/or a particular combination and/or a particular amount of feed.

In order that the displaceable vehicle can pass in a simple manner through walls and the like of the installation, the installation is provided with gates closed by flexible means for enabling each displaceable vehicle to pass through.

The invention also relates to an autonomously displaceable vehicle for use in such an installation, the vehicle comprising a drinking nozzle, such as a flexible teat. The drinking nozzle is preferably movably mounted relative to the remaining part of the displaceable vehicle. The vehicle is advantageously provided with animal identification means for identifying an animal and for supplying an identification signal indicative of the identity of an animal. Here, the drinking nozzle is preferably movable by means of the identification signal.

BRIEF DESCRIPTION OF THE DRAWINGS

An embodiment of an installation and a displaceable vehicle according to the present invention will now be described with reference to the drawings, in which.

DESCRIPTION OF ILLUSTRATIVE EMBODIMENTS

Figure 1:
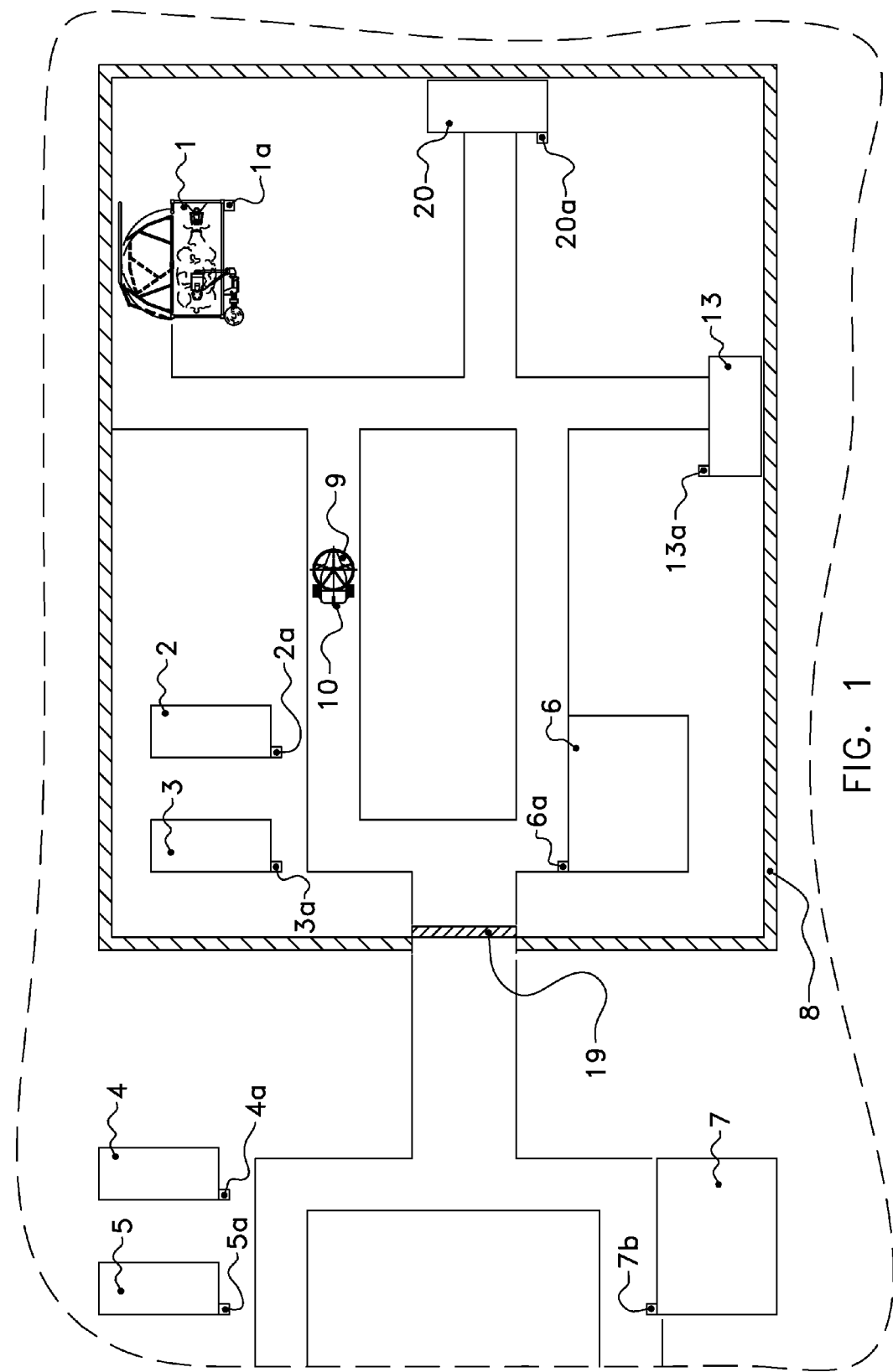
FIG. 1 is a diagrammatic plan view of an installation according to the invention with a milking machine and individual and group feeding places.

An installation for supplying liquid feed to an animal, such as a calf, is shown in a diagrammatic plan view in FIG. 1. The installation comprises one or more feed loading places, in the embodiment shown in FIG. 1 a milking machine 1, in the example a milking machine with a (non-shown) device for automatically connecting teat cups to the teats of a dairy animal. The installation also comprises one or more feed unloading places 2-7, the situation in the embodiment shown in FIG. 1 being such that the feed unloading places 2, 3 and 6 are located in a stable 8 and that the feed unloading places 4, 5 and 7 are located outside the stable 8. Moreover, the feed unloading places 2, 3, 4, 5 are feed unloading places for containing only one animal, so-called igloo housings, and the feed unloading places 6, 7 are suitable for containing several animals.

The installation further comprises one or more vehicles that are autonomously displaceable, controlled by a microprocessor 22 or the like, between the milking machine 1 and the feed unloading places 2-7, only one vehicle 9 being shown in FIG. 1 for the sake of clarity, although it will be obvious that any other number of vehicles will be applicable within the scope of the invention. Autonomously displaceable vehicles for performing many different functions, as well as the control of such vehicles, are known per se and will consequently not be described here in detail. Automatic loading of the energy supply of the vehicle and automatic loading and unloading of other materials into and from, respectively, containers present on the vehicle, is known as well. It is sufficient to refer to the following patent documents: U.S. Pat. No. 2,966,256, DE-1109441, DE-1183301, EP-0382693, DE-4425924, U.S. Pat. No. 5,309,592, EP-0142594, DE-4444508, GB-2313190, U.S. Pat. No. 5,109,566, GB-2313191, U.S. Pat. No. 3,273,038, NL-7416427, U.S. Pat. Nos. 5,341,540, 5,646,494, EP-0943235, EP-1369010, EP-1369012 and EP-1369017 the contents of all of which are hereby incorporated by reference in their entirety.

For the purpose of an accurate position determination and identification of the relevant milking machine 1 and the feed unloading places 2-7, these are provided with markings 1a-7a, respectively, to be read by the microprocessor of the vehicle 9. For this purpose, the vehicle 9 comprises means for reading/detecting these markings 1a-7a, which means are known per se.

According to the invention, the vehicle 9 comprises a drinking nozzle 10, such as a flexible teat, so that liquid feed carried by the vehicle 9, for example stored in a container, can be supplied to a calf present in the feed unloading places 2-7.

Figure 2:
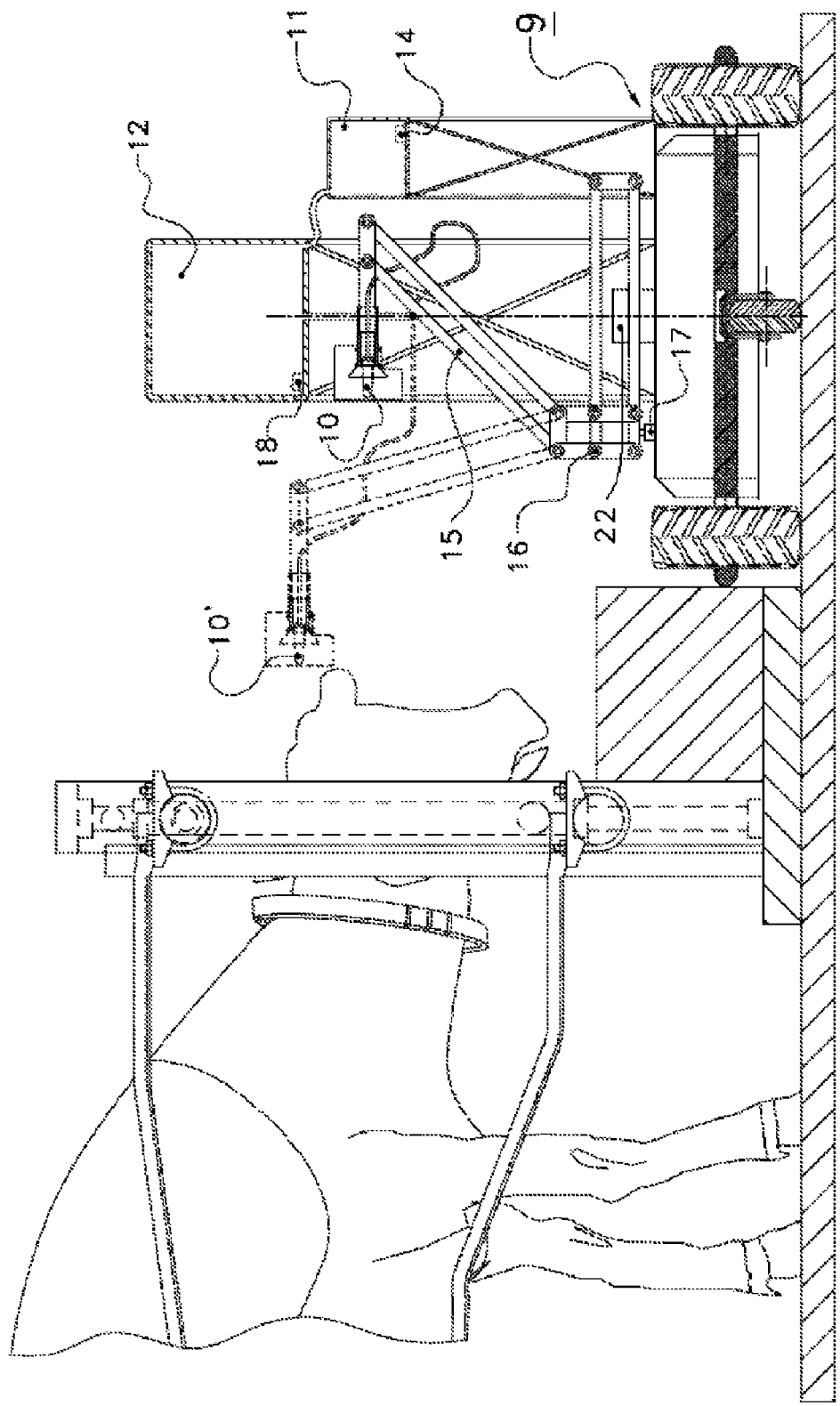
FIG. 2 is a diagrammatic view of an autonomously displaceable vehicle for use in the installation of FIG. 1.

Although the stable 8 can be thermally insulated from the outside environment to a certain extent, the environment will nevertheless influence the temperature of the liquid feed carried by the vehicle 9. In order to reduce said thermal influence by the environment as far as possible, the vehicle 9 comprises one or more thermally insulating storage means 11 for liquid feed (see FIG. 2). Although only one storage device 11 is shown in FIG. 2, it will be obvious that two or more storage means are also applicable in the invention. Said thermally insulating storage means, which are known per se, make it possible to keep the temperature of the liquid feed stored therein constant for a long time, so that it is even possible for the liquid feed that is transferred to the feed unloading places 4, 5, 7 located outside the stable 8 to have at that location almost the same temperature as the temperature of the liquid feed when it was supplied in the storage device 11.

Although it is possible to make use of an active control of the temperature of the liquid feed present on the autonomously displaceable vehicle, such an active control requires a certain amount of energy. For the purpose of supplying this energy from the autonomously displaceable vehicle 9 itself, it would be possible to make use of a separate supply source, which, however, occupies much place and, due to its weight, requires more energy for propelling the autonomously displaceable vehicle 9. Alternatively, it would be possible to use for the temperature control the same energy source as that being used for propelling the autonomously displaceable vehicle. However, this means that there is less energy available for propelling, so that the working range of the autonomously displaceable vehicle is adversely affected. Consequently, in a preferred embodiment of the invention, the vehicle 9 comprises a passive heat exchanger 12 with a container for a heat exchange medium and suitable lines for circulating the heat exchange medium, which lines are designed in such a way that they are also in contact with the liquid feed. Contrary to an active control, a passive heat exchanger 12 occupies less space and is less heavy and, furthermore, such a passive heat exchanger does not use energy, so that the working range of the autonomously displaceable vehicle 9 is not adversely affected, except for the little loss of working range due to the weight added to the vehicle as a result of the presence of the passive heat exchanger.

A particularly suitable and effective passive heat exchanger comprises a reservoir 12 for hot water for heating/cooling the liquid feed present in the storage device 11 or for heating/cooling the liquid feed present in the teat 10 or in the lines to the teat 10. The water to be received by the reservoir is preferably obtained from an element 13 (see FIG. 1, with corresponding identification and position marking 13a) for automatically supplying hot water in the reservoir 12, the element comprising a (non-shown) heating device for the water. Such an element with a heating device can be located anywhere in the installation, it being possible for the heating device to be provided with energy by the usual mains power supply.

Autonomously displaceable vehicles for numerous applications are known per se, many different ways of automatically controlling the vehicle being used. Since there are several loading and unloading places in the installation according to the invention, it is advantageous, inter alia for keeping the temperature of the liquid feed as constant as possible, if the (non-shown) microprocessor or the like is provided with a (non-shown) computer with a (neither shown) memory, the memory being designed to contain data relating to expected and/or historical travelling times of the displaceable vehicle 9 from the milking machine 1 to a relevant feed unloading place 2-7, and/or from a given feed unloading place 2-7 to another feed unloading place 2-7 and/or from a feed loading place to another feed loading place (if present). This makes it possible, when supplying feed, not only to take the travelling times of the vehicle 9 into account, but also to control the heating device at least partially with the aid of the data relating to the expected and/or historical travelling times. If, for example, the travelling time is proportionally long, the hot water can be proportionally hotter for keeping the liquid feed longer at a particular temperature. It is pointed out that also expected/historical travelling times from and to other places of the installation can be stored, such as, for example, to and from the place 13 where, for example, hot water can be stored in the vehicle 9.

A displaceable vehicle is advantageously provided with a temperature sensor 14 for measuring the temperature of the liquid feed and for supplying a temperature signal indicative of the temperature of the liquid feed. In this case, the displaceable vehicle 9 preferably comprises an activating element for effecting the heating and/or cooling of the liquid feed by the passive heat exchanger, the activating element being controlled by the temperature signal. In this case, the activating element can be, for example, a valve that is opened so that hot water from the reservoir 12, preferably located on the vehicle at a higher level than a storage device 11 for the liquid feed, will flow along the liquid feed by gravitational force. A small pump could be used as an activating device, if desired. A temperature sensor 18 for measuring the temperature of the hot water in the container 12 can be provided, if desired. As shown in FIG. 2, by means of, for example, a parallelogram construction 15, the drinking nozzle 10 is movably mounted relative to the remaining part of the displaceable vehicle from a withdrawn first position of the nozzle 10' indicated by uninterrupted lines to an extended position of the nozzle 10' indicated by interrupted lines. This means that, on the one hand, it is possible, for example, to move the drinking nozzle 10' forward in such a way that it is easily accessible for an animal and, on the other hand, it is possible to attune the position of the drinking nozzle to the dimensions of an animal by using, for example, a height adjusting device 16 with an operating cylinder 17. In the latter case, it is advantageous if the displaceable vehicle is provided with animal identification means for identifying an animal and for supplying an identification signal indicative of the identity of an animal, the identification signal, besides for other objectives, such as supplying particular sorts of feed, being used in particular for moving the drinking nozzle. It is pointed out here that such animal identification means are known per se. The milk obtained in the milking machine 1 being relatively warm, it is advantageous to transport the milk obtained as quickly as possible to a relevant animal in order that as little energy as possible is needed to keep the milk at a particular temperature. In an embodiment of an installation according to the invention, this is achieved in that the milking machine 1 comprises a detection device for detecting the arrival of an animal in the milking machine 1 and for supplying a detection signal. Said detection signal can then be used for controlling the displacement of the displaceable vehicle 9, so that the vehicle is displaced to the milking machine 1 by means of the detection signal. In this manner it is possible for the vehicle 9 to arrive at the milking machine 1 as quickly as possible and to take the milk that has cooled as little as possible from the milking machine 1 or a storage device located in its vicinity, and to transport it to the relevant feed unloading place 2-7. It is pointed out here that means for detecting that a particular animal has entered the milking machine are known per se. In order to provide a sufficient animal feeding, an embodiment of an installation according to the invention comprises means for controlling one or more displaceable vehicles in such a way that at least twice a day liquid feed is offered twice to each individual feeding place 2, 3, 4, 5 and to each group feeding place 6, 7. Such a control is achieved in particular by means of software, it being possible to use the computer disposed on the vehicle or a central computer linked thereto. In this case, control by means of software can also take place in such a way that the vehicle 9 offers the feed to an animal only during a particular maximum period of time. If desired, a flow meter can then be disposed in the nozzle 10 to detect whether an animal is (still) consuming liquid feed. By means of the signals obtained by said flow meter it is possible to deduce how much feed an animal consumes and whether the animal has stopped drinking, after which the vehicle can be displaced further.

Each displaceable vehicle 9 is preferably provided with means for supplying liquid feed to an animal, the means for supplying liquid feed to an animal in a group feeding place supplying feed on the basis of an animal identification signal obtained from the animal identification means. A group feeding place can be determined as such by making use of means for determining the position of the displaceable vehicle that are known per se, which means compare the current position with the position of the group feeding place, which position may have been inputted beforehand into the computer/microprocessor for controlling the vehicle. Here it is possible to make use of the markings 6a and 7a.

Since animals in individual feeding places 2-5 need not be provided with a device for supplying an animal identification signal (these animals are, for example, intended for slaughter), in a favorable embodiment of an installation according to the invention, the installation is provided with means 2a-5a for determining the position of each individual feeding place 2-5 and for supplying a position signal, and the means for supplying liquid feed to an animal in an individual feeding place supply feed on the basis of the relevant position signal. The sort of feed to be supplied may, for example, be inputted beforehand into the computer/microprocessor, for example by a farmer who wishes to give an animal in a particular individual feeding place always a particular sort and/or a particular combination and/or a particular amount of feed. The latter also holds for those animals that do wear an animal identification device, for example a transponder worn around the neck.

In order that the displaceable vehicle can pass in a simple manner through walls and the like of the installation, the installation is provided with gates 19 closed by flexible means for enabling the displaceable vehicle 9 to pass through. Instead of flexible means that are opened by pushing by the vehicle 9 itself, in an alternative embodiment, it is also possible to make use of controlled gates, said gates being controlled by the signal indicating the position of the vehicle 9 and the route of the vehicle determined by the computer system. The installation according to the invention operates, for example, in the following manner. At the moment when it is detected that a dairy animal enters the milking machine 1, there is supplied a signal by means of which the vehicle 9 will move to the milking machine 1. When the vehicle has arrived there, the milk is transferred in a manner known per se to the storage device 11. The temperature of the milk is measured by the sensor 14, and in the computer system it is analyzed whether the travelling time to the place to which the milk has to be transported, for example the igloo housing 4, is so long that it can be expected that the milk will cool whether or not to below a desired value. If this is not the case, after enough milk has been brought into the storage device 11, for example detected by a (non-shown) level sensor, the vehicle 9 can be moved directly to the igloo housing 4. After it has been found that enough milk has been brought into the storage device 11, there is also supplied a signal to the milking machine (or the relevant milk transferring device) in order that the milk obtained thereafter will be transferred to another storage device, which may also form a separate feature of the invention. If, after analyzing, it is found that the milk would cool too much, it is first checked whether the temperature (sensor 18) and the amount of hot water (measured by a non-shown level sensor) are sufficient for keeping the temperature of the milk sufficiently high until the igloo housing 4 has been reached. If so, the vehicle 9 is displaced to the igloo housing 4 and during said displacement the heat exchanger is activated as frequently as necessary to keep the temperature of the milk at a sufficient level. If the temperature and/or the level of the hot water are/is insufficient, the vehicle 9 is first moved to the device 13 for automatically supplying hot water. During the displacement of the vehicle 9 to said device 13 there is already supplied a signal by the computer system to the device 13 in order to prepare an amount of hot water, calculated by suitable software and having a calculated temperature, to be supplied in the container 12, which amount and temperature are sufficient for keeping the milk at a particular temperature when the vehicle is being displaced from the device 13 to the igloo housing 4. It is thus prevented that an excessive energy consumption occurs, owing to the fact that exactly the proper amount/temperature is chosen for supplying the milk, it also being possible to take the expected drinking time of the animal present in the igloo housing 4, for example a calf, into account.

If desired, the installation can be provided with means 20 for automatically supplying additives, such as medicines, vitamins, special sorts of milk powder and the like (with associated identification/position marking 20a), the computer system moving the vehicle 9 to said means, if necessary. Such means, provided with means for mixing, for example, milk powder with water, if desired, and supplying the mixed liquid feed in the storage device 11, are known per se. At the place where the igloo housing 4 is located the computer system retrieves the data regarding the animal received in the igloo housing 4 (by retrieving the data the farmer has inputted for igloo housing 4, identified by marking 4a, into the computer system), and sets the height and the degree of extension to outside the vehicle at the values recorded for that animal. If the animal wears an animal identification device, the setting can take place (partially) on the basis of said animal identification device.

Thus, the invention has been described by reference to certain embodiments discussed above. It will be recognized that these embodiments are susceptible to various modifications and alternative forms well known to those of skill in the art.

Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. An installation for supplying liquid feed to an animal, the installation comprising one or more feed loading places and one or more feed unloading places, and further comprising one or more vehicles that are autonomously displaceable, controlled by a processor, between one or more of the feed loading places and one or more of the feed unloading places, each vehicle comprising a drinking nozzle, the drinking nozzle movably mounted onto the displaceable vehicle, and the vehicle further comprising a height adjusting device for adjusting a height of the drinking nozzle to a height of the animal at at least one feed unloading place.

2. The installation as claimed in claim 1, wherein the displaceable vehicle is provided with an animal identification unit for identifying an animal and for supplying an identification signal indicative of the identity of an animal.

3. The installation as claimed in claim 2, wherein the drinking nozzle is movable in response to the identification signal.

4. The installation as claimed in claim 1, wherein the drinking nozzle is movable in response to an identification signal indicative of the identity of an animal.

5. The installation as claimed in claim 1, wherein the installation comprises one or more individual feeding places, each for containing only one animal, and one or more group feeding places, each for containing several animals.

6. The installation as claimed in claim 5, wherein the processor is configured for controlling one or more of the displaceable vehicles so that at least twice a day liquid feed is offered twice to animals in each individual feeding place and to animals in each group feeding place.

7. The installation as claimed in claim 6, wherein the displaceable vehicle is provided with an animal identification unit for identifying an animal and for supplying an identification signal indicative of the identity of an animal, and wherein the drinking nozzle is movable in response to the identification signal.

8. The installation as claimed in claim 1, wherein a feed loading place comprises a milking machine.

9. An autonomously displaceable vehicle for use in an installation for supplying liquid feed to an animal, wherein the vehicle comprises a drinking nozzle, the drinking nozzle movably mounted onto the displaceable vehicle, with a height adjusting device for adjusting the height of the drinking nozzle to a height of the animal at a feed unloading place; wherein the vehicle is provided with an animal identification unit for identifying an animal and for supplying an identification signal indicative of the identity of an animal; and wherein the drinking nozzle is moved in response to the identification signal.

* * * * *